(12) United States Patent
Reisch et al.

(10) Patent No.: US 8,851,260 B2
(45) Date of Patent: Oct. 7, 2014

(54) POSITIVELY ENGAGING SHIFTING ELEMENT WHICH CAN BE HYDRAULICALLY OR PNEUMATICALLY ACTUATED

(75) Inventors: Matthias Reisch, Ravensburg (DE); Ralf Dreibholz, Meckenbeuren (DE); Gerhard Gumpoltsberger, Friedrichshafen (DE); Mark Mohr, Tettnang (DE); Manuel Götz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 430 days.

(21) Appl. No.: 12/988,250

(22) PCT Filed: Mar. 24, 2009

(86) PCT No.: PCT/EP2009/053430
§ 371 (c)(1),
(2), (4) Date: Nov. 19, 2010

(87) PCT Pub. No.: WO2009/127498
PCT Pub. Date: Oct. 22, 2009

(65) Prior Publication Data
US 2011/0108384 A1 May 12, 2011

(30) Foreign Application Priority Data
Apr. 16, 2008 (DE) .......................... 10 2008 001 197

(51) Int. Cl.
*F16D 25/061* (2006.01)
*F16D 48/02* (2006.01)
(52) U.S. Cl.
CPC ...... *F16D 25/061* (2013.01); *F16D 2048/0212* (2013.01)
USPC .................... 192/85.18; 192/69.82; 192/85.38
(58) Field of Classification Search
USPC ................. 192/85.18, 53.5, 69.4–69.43, 69.8, 192/69.82, 85.38, 85.37
See application file for complete search history.

(56) References Cited

U.S. PATENT DOCUMENTS 776,404 A * 11/1904 Keyser .......................... 192/53.5
2,665,674 A * 1/1954 Metsger et al. ............. 192/85.18
(Continued)

FOREIGN PATENT DOCUMENTS

DE 10126485 A1 12/2002
DE 10244023 A1 4/2004

OTHER PUBLICATIONS

International Search Report for International Application No. PCT/EP2009/053430, dated Jul. 17, 2009, 2 pages.
Translation of International Preliminary Report on Patentability for International Application No. PCT/EP2009/053430, dated Jun. 21, 2010, 5 pages.

*Primary Examiner* — Rodney H Bonck
(74) *Attorney, Agent, or Firm* — Brinks Gilson & Lione

(57) ABSTRACT

The invention relates to a positively engaging shifting element which can be hydraulically or pneumatically actuated, comprising a hydraulically or pneumatically actuatable piston (I) having a piston compartment (2) containing a hydraulic medium or pressure medium, a jaw (3) having a dog-type gearing (4) and a mating jaw (5) with which the dog-type gearing (4) meshes when engaged. The engaging speed of the jaw (3) can be increased by decoupling the jaw (3) from the hydraulic or pneumatic volume flow when the jaws (3) and (5) are in a tooth butt position in relation to each other and by pretensioning the jaw (3) by means of a mechanical device (6) that is actively connected to the piston (I). The gap between the jaws, i.e. the window into which the jaw (3) can be engaged is maintained as narrow as possible in order for a tooth butt position of the jaws (3) and (5) in relation to each other being highly probable when the shift element is applied.

9 Claims, 2 Drawing Sheets

(56) References Cited

U.S. PATENT DOCUMENTS

Figure 1:
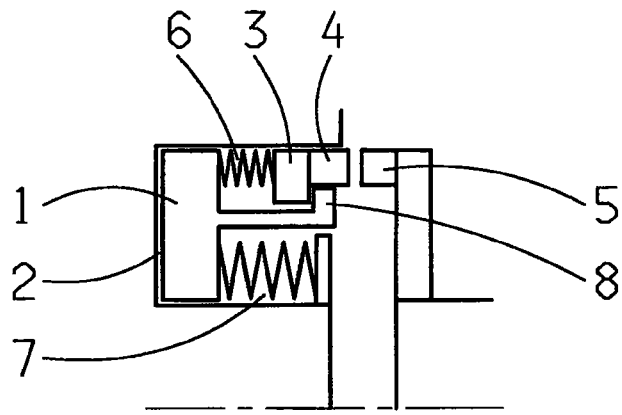

| | | | |
|---|---|---|---|
| 3,602,345 A * | 8/1971 | Rattenberg et al. | 192/108 |
| 3,679,032 A | 7/1972 | Bennett | |
| 4,019,586 A * | 4/1977 | Hauser | 192/69.62 |
| 4,269,294 A * | 5/1981 | Kelbel | 192/69.4 |
| 4,618,044 A * | 10/1986 | Fujikawa et al. | 192/69.4 |
| 5,123,513 A * | 6/1992 | Petrak | 192/85.07 |
| 5,413,201 A * | 5/1995 | Vidal | 192/69.41 |
| 5,535,869 A * | 7/1996 | Bigley et al. | 192/69.41 |
| 5,839,556 A * | 11/1998 | Crawford et al. | 192/69.71 |
| 6,039,162 A * | 3/2000 | Marsic | 192/108 |
| 6,112,873 A | 9/2000 | Prasse et al. | |
| 6,962,549 B2 | 11/2005 | Dreibholz et al. | |
| 2003/0121745 A1 | 7/2003 | Ai | |
| 2007/0221464 A1* | 9/2007 | Liu | 192/69.7 |

* cited by examiner

POSITIVELY ENGAGING SHIFTING ELEMENT WHICH CAN BE HYDRAULICALLY OR PNEUMATICALLY ACTUATED

This application is a filing under 35 U.S.C. §371 of International Patent Application PCT/EP2009/053430, filed Mar. 24, 2009, which claims priority to German Application No. 10 2008 001 197.5, filed Apr. 16, 2008, each of which is hereby incorporated by reference herein in its entirety.

The present invention relates to a hydraulically or pneumatically operable positive locking clutch.

In particular, the invention relates to a hydraulically or pneumatically operable positive locking clutch for a power-shift automatic transmission, preferably for an automatic transmission with a planetary construction, reduction gearing construction or in a hybrid construction or for a continuously variable transmission with multiple stages, such as for a hydrostatic, mechanic or electric multistage transmission.

With power-shift automatic transmissions, it is normally the case that hydraulically operable multiple disk clutches are used. These are compressed by means of a hydraulically actuated piston, the pressure of which is controlled by a hydraulic control device, and thereby operated in this manner. By specifically adjusting the actuating force and, consequently, the friction moment, it is possible to produce a load circuit without traction force at a differential speed.

This has the disadvantage that with said multiple disk clutches, when disengaged, due to the minimal separation of the frictional surfaces and the oil, or respectively, mixture of air and oil contained therein, slippage occurs with the rotational speed differences.

Positive locking clutches, or dog clutches and brakes are known from many other vehicle and particularly transmission applications; for example, clutches of this type are used in automatic reduction gearing transmissions or in transversal or longitudinal differential locks. With these applications, the clutch may normally be actuated pneumatically or electromechanically.

With certain structural conditions it is possible to replace multiple disk clutches with positive locking clutches. This is the case when dealing with clutches which disengage when shifting to a higher gear, or clutches which are only used in reverse gear.

A transmission of this type, for example is disclosed in the DE 10244023 A1 of the applicant. Here, an automatic transmission is proposed containing numerous clutches and gearwheels, which can be shifted in a power flow, whereby for setting a conversion in each case at least one of the clutches is engaged.

With the known transmissions, the clutch, which is engaged when shifting to a higher gear, is constructed as a friction engaged clutch, whereby the clutch, in each case, has only one clutch which is disengaged when shifting to a higher gear which is a positive locking clutch in the form of a dog clutch. According to the DE 10244023 A1, the positive locking clutch may be actuated hydraulically or pneumatically.

Through the use of positive locking clutches, or dog clutches, slippage is avoided for the most part. Furthermore, dog clutches require less force to be actuated and less space than multiple disk clutches due to the positive locking transference.

In order to hydraulically actuate positive locking clutches or dog clutches in an automatic transmission with hydraulic control, a suitable actuation of the dog clutch by means of the already existing hydraulic force is particularly advantageous.

When a dog clutch is connected directly to a piston of a hydraulic system, there is the disadvantage that with a tooth butt position, as a result of the sudden halting of the piston, a backlash to the hydraulic system occurs, particularly with numerous repulsions. Furthermore, in overcoming the tooth butt position, the engagement rate of the dog clutch may be too slow to generate sufficient contact between the load-bearing surfaces in a sufficiently short period of time, because the rate of positioning of the elements is dependent on the available flow rate and thereby on the pump layout and the capacities of the channels as well as the piston size.

Situations may also arise whereby that with a certain speed differential, the speed is not sufficient to engage the gears adequately when they are interlocking to ensure sufficient engagement.

To solve this problem, the engagement spacing may be enlarged; alternatively, or additionally, the tapering of the gear teeth can be altered. In the case of enlarging the spacing, the turnover play increases during a power shifting of the clutch, which disadvantageously may have a negative effect on driving comfort and the noise level.

In the case of tapering of the gear teeth axial repelling forces occur, whereby the gear teeth must be engaged by force; furthermore, said axial forces have a corresponding negative effect to the effected axial bearing regarding durability and effectiveness.

The present invention has the underlying object of providing a hydraulically or pneumatically operable positive locking clutch, which is suited for use in a power shift automatic transmission or in a continuously variable transmission, whereby the specified known disadvantages of the prior art can be avoided. In particular, the engagement speed of the gear teeth in the clutch should be increased, thereby ensuring a sufficient contact of the load-bearing gear teeth surfaces.

This object shall be achieved by means of the characteristics of the examples described herein.

Accordingly, a hydraulically or pneumatically operable positive locking clutch is proposed containing a hydraulic or pneumatic piston, having a piston chamber in which the hydraulic fluid or pressure fluid is located, a gear with gear teeth and a counter gear in which the gear teeth of the gear interlock when in the engaged state, with which the engagement rate of the gear is improved through disengaging the gear and the counter gear from a tooth butt position with the hydraulic, or respectively, pneumatic flow and by preloading the gear by means of a mechanical device.

According to a further development of the invention, gear spacing, i.e. the moment, in which the teeth are engaged, is kept to a minimum, in order to achieve the highest possible probability of a tooth-butt position in the engaged state of the clutch. For this, there is enough time in a defined moment in the rotational rate to supply sufficient power flow, and to store the thereby resulting energy in the mechanical device. When the gear tooth engages with a gap, according to the invention, the gear will be greatly accelerated by means of the stored energy, whereby sufficient contact of the gear surfaces is ensured.

In the framework of a particularly advantageous embodiment of the invention it is proposed that the mechanical device for pre-loading the gear of the clutch should be comprised of a spring, the pressure of which is controlled by a hydraulic or pneumatic control device through the hydraulically or pneumatically actuated pistons, and the gear of the clutch is arranged in such a manner that it pushes the gear and the piston apart.

The clutch, according to the invention, has a restraining device, which catches the gear between itself and the spring, in order to prevent the gear from being moved axially towards the counter gear when the piston is not engaged.

Furthermore, an additional spring for pushing the clutch back into place (in the case that the clutch in a non-pressurized state is open) is provided, whereby this spring pushes against the piston action when it is hydraulically operated.

Figure 2:
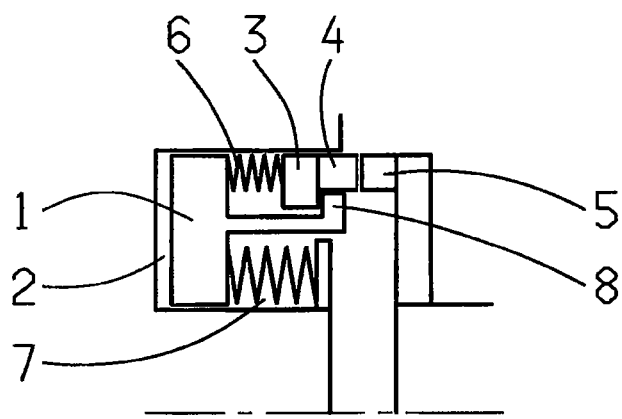
Figure 3:
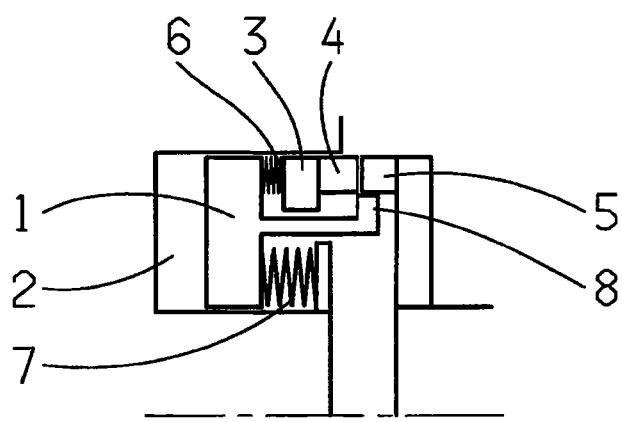
Figure 4:
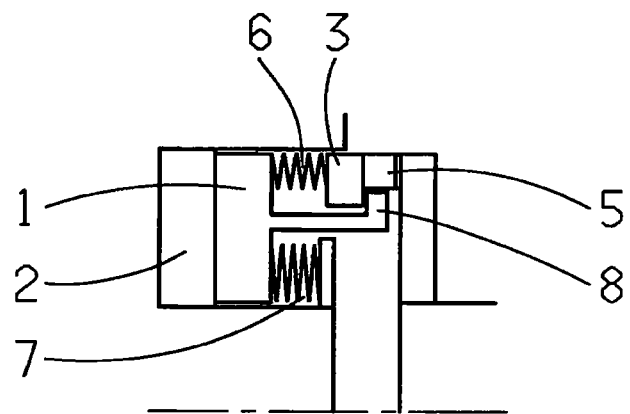

In the following, the invention shall be explained in greater detail based on the illustrations. They show:

FIG. 1: A schematic sectional view of a preferred embodiment of a positive locking clutch in the disengaged state;

FIG. 2: A schematic sectional view of the positive locking clutch from FIG. 1 according to the invention in the applied state;

FIG. 3: A schematic sectional view of the positive locking clutch from FIG. 1 according to the invention in the pre-loaded state;

FIG. 4: A schematic sectional view of the positive locking clutch from FIG. 1 according to the invention in the engaged state; and FIG. 5: A schematic sectional view of a further preferred embodiment of a positive locking clutch according to the invention in the disengaged state.

FIG. 1 shows an exemplary construction of a hydraulically or pneumatically operable positive locking clutch according to the invention.

The clutch contains a hydraulically or pneumatically operable piston 1, having a piston chamber 2 in which the hydraulic fluid, or respectively, pressure medium is located, a gear 3 with gear teeth 4 and a counter gear 5, in which the gear teeth are inserted when in the engaged state.

In accordance with the invention, a spring 6 is provided as a mechanical device for pre-loading the gear 3, which is located between the piston 1 and the gear 3 in such a manner that it pushes the gear 3 and the piston 1 apart. By means of the spring 3, the movement of the piston 1 is extended allowing the gears 3 and 5 to be pushed further against each other when a tooth butt position has been achieved.

Furthermore, as can be seen in FIG. 1, a spring 7, serving as a release spring to return (in the case that the clutch is open in a non-pressurized state, which corresponds to the embodiment shown) or to engage (in the case that the clutch in the non-pressurized state is closed) the gear 3, is provided, whereby the spring 7 acts against the piston 1 when said is hydraulically or pneumatically actuated.

With the example shown in FIG. 1, the clutch is open in the non-pressurized state, such that the spring 7 acts against the piston 1 when it is pushed to the right.

In the case where the clutch is closed, or respectively, in the "normally closed position" in the non-pressurized state, the piston chamber 2 and the spring 7 exchange roles.

In the framework of a further embodiment, instead of spring 7, an additional pressure chamber 9 is provided, in order that the returning (in the case where the clutch is open in the non-pressurized state), or respectfully, releasing (in the case where the clutch is engaged in the non-pressurized state) of the gear is achieved hydraulically, by creating a counter-pressure which acts on the piston 1.

According to the invention, a restraining device 8 is provided with the clutch, which catches the gear between itself and the spring 6, in order to prevent the gear from moving axially towards the counter gear when the piston is not actuated. In the example shown, the restraining device is implemented as part of the piston 1 and has a positive locking construction; the gear 3 is held between the spring 6 and the device 8. Ideally, the restraining device 8 is integrated in the piston 1.

Furthermore, in accordance with the invention, it is intended that the gear spacing be kept to a minimum, in order that the probability of a tooth butt position is as high as possible when engaging the clutch.

In FIG. 2, the clutch, according to the invention, of FIG. 1 is shown in the applied state, whereby the configuration of the gear 3 to the counter gear 5 is a tooth butt position; the spring 3 is not yet pre-loaded.

When the piston 1 in a tooth butt position is moved further in the direction of the maximal position by means of the power flow (i.e. in the figure, towards the right) the spring 6, as is shown in FIG. 3, is compressed and pre-loaded, whereby when the gear 3, or respectively the gear teeth 4 meet a gap in the counter gear in the course of a further rotation, the gear 3 is strongly accelerated by the energy stored in the spring 6, and thereby very quickly engaged, whereby a sufficient surplus of pressure to the load-bearing gear surface is obtained. The clutch according to the invention in the engaged state is the object of FIG. 4.

Figure 5:
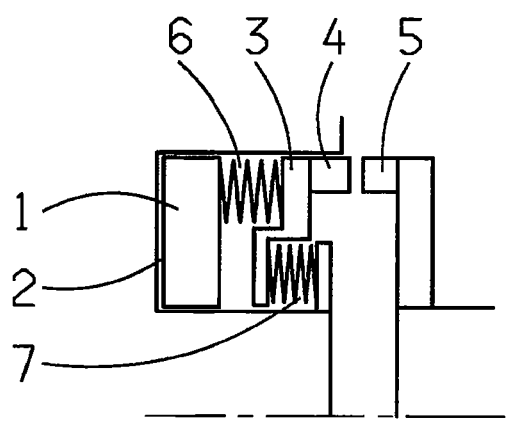

In the framework of a further embodiment of the invention, which is the object of FIG. 5, the releasing spring 7 does not act directly on the piston 1 but rather directly on the gear 3 and thereby indirectly via the spring 6 on the piston 1; the spring 3 is, analogous to the embodiment example according to FIGS. 1,2,3 and 4, located between the gear 3 and the piston 1 and allows for an extension of the pushing of the piston in a tooth butt position and in this manner, a resulting pre-loading of the spring 3. In the example shown in FIG. 5, a separate restraining device is not needed, because a movement of the gear 3 without actuation of the piston 1 is prevented by the spring 7.

In accordance with the invention, the springs 6 and 7 may consist of single spiral springs, as spiral spring assemblies, as disk springs, as disk spring assemblies or as another type of mechanical spring.

Furthermore, the pressure fluid used for actuating the piston may be oil, air or another suitable pressure medium.

In addition, the gear teeth as well as the axial gears can also be radial gears, or respectively, any positive locking devices suited to the transference of torque. In an implementation of a dog clutch, i.e. when both sides spin, a supplementary synchromesh 10 may be used advantageously, which can be arranged in the space of the releasing spring.

It is understood that all constructive configurations, in particular all spatial arrangements of the components of the clutch according to the invention in and of themselves, as well as in relation to each other and thereby technically meaningful, come under the scope of protection of the present claims, without influencing the function of the clutch as it is given in the claims, even when said configurations are not explicitly presented in the figures or in the description.

REFERENCE SYMBOLS

1 Piston
2 Piston chamber
3 Gear
4 Gear teeth
5 Counter gear
6 Spring
7 Release spring
8 Restraining device

The invention claimed is:
1. A positive locking clutch comprising:
a hydraulically or pneumatically operable piston comprising a first pressure chamber configured to hold a pressure medium within;

a gear with gear teeth;
a counter gear with counter gear teeth and counter gear gaps configured to interlock with the gear teeth of the gear with minimal gear spacing when the clutch is in an engaged state;
a mechanical pre-loading device configured to apply a pre-loading force upon the gear in the direction of engagement with the counter gear when the piston is actuated and the gear teeth abut the counter gear teeth in a tooth-to-tooth position;
wherein the clutch enters the engaged state by acceleration of the gear in the direction of the counter gear due to the pre-loading force when the gear teeth of the gear meet the counter gear gaps during relative rotation of the gear and counter gear;
wherein the mechanical pre-loading device comprises a first spring arranged between the piston and the gear, wherein the first spring is configured to push the piston and gear apart;
a return device configured to return the gear to a default state when the piston is not pressurized, wherein the return device comprises a second pressure chamber configured to return the gear to the default state through the building up of counter pressure actuating the piston when the piston is not pressurized.

2. A positive locking clutch according to claim 1, wherein the default state is a non-engaged state.

3. A positive locking clutch according to claim 1, wherein the default state is an engaged state.

4. A positive locking clutch according to claim 1, further comprising a restraining device configured to catch the gear between itself and the pre-loading device, thereby restraining the gear from movement toward or away from the counter gear when the piston is not actuated, wherein the restraining device extends from the piston.

5. A positive locking clutch according to claim 1, further comprising a synchromesh.

6. A positive locking clutch comprising:
a hydraulically or pneumatically operable piston comprising a first pressure chamber configured to hold a pressure medium within;
a gear with gear teeth;
a counter gear with counter gear teeth and counter gear gaps configured to interlock with the gear teeth of the gear with minimal gear spacing when the clutch is in an engaged state;
a mechanical pre-loading device configured to apply a pre-loading force upon the gear in the direction of engagement with the counter gear when the piston is actuated and the gear teeth abut the counter gear teeth in a tooth-to-tooth position;
wherein the clutch enters the engaged state by acceleration of the gear in the direction of the counter gear due to the pre-loading force when the gear teeth of the gear meet the counter gear gaps during relative rotation of the gear and counter gear;
wherein the mechanical pre-loading device comprises a first spring arranged between the piston and the gear, wherein the first spring is configured to push the piston and gear apart;
a return device configured to return the gear to a default state when the piston is not pressurized, wherein the return device comprises a return spring that acts directly on the piston.

7. A positive locking clutch according to claim 6, wherein the first spring and the return spring are selected from a group consisting of single spiral springs, spiral spring assemblies, disk springs, disk spring assemblies or another type of mechanical spring.

8. A positive locking clutch comprising:
a hydraulically or pneumatically operable piston comprising a first pressure chamber configured to hold a pressure medium within;
a gear with gear teeth;
a counter gear with counter gear teeth and counter gear gaps configured to interlock with the gear teeth of the gear with minimal gear spacing when the clutch is in an engaged state;
a mechanical pre-loading device configured to apply a pre-loading force upon the gear in the direction of engagement with the counter gear when the piston is actuated and the gear teeth abut the counter gear teeth in a tooth-to-tooth position;
wherein the clutch enters the engaged state by acceleration of the gear in the direction of the counter gear due to the pre-loading force when the gear teeth of the gear meet the counter gear gaps during relative rotation of the gear and counter gear;
a restraining device configured to catch the gear between itself and the pre-loading device, thereby restraining the gear from movement toward or away from the counter gear when the piston is not actuated, wherein the restraining device extends from the piston and is integrated with the piston.

9. A positive locking clutch comprising:
a hydraulically or pneumatically operable piston comprising a first pressure chamber configured to hold a pressure medium within;
a gear with gear teeth;
a counter gear with counter gear teeth and counter gear gaps configured to interlock with the gear teeth of the gear with minimal gear spacing when the clutch is in an engaged state;
a mechanical pre-loading device configured to apply a pre-loading force upon the gear in the direction of engagement with the counter gear when the piston is actuated and the gear teeth abut the counter gear teeth in a tooth-to-tooth position;
wherein the clutch enters the engaged state by acceleration of the gear in the direction of the counter gear due to the pre-loading force when the gear teeth of the gear meet the counter gear gaps during relative rotation of the gear and counter gear;
wherein the mechanical pre-loading device comprises a first spring arranged between the piston and the gear, wherein the first spring is configured to push the piston and gear apart;
a return device configured to return the gear to a default state when the piston is not pressurized, wherein the return device comprises a return spring that acts directly on the gear and indirectly on the piston through the first spring, and the return spring restrains the gear from movement both toward and away from the counter gear when the piston is not actuated.

\* \* \* \* \*